N. RANSOHOFF.

TUMBLING BARREL.

APPLICATION FILED MAY 28, 1920.

Reissued Nov. 28, 1922.

15,498.

2 SHEETS—SHEET 1.

Witness

Harris E. Aldem.

Inventor:

Nathan Ransohoff

By Wood & Wood

Attorneys

N. RANSOHOFF.
TUMBLING BARREL.
APPLICATION FILED MAY 28, 1920.
Reissued Nov. 28, 1922. 15,498.
2 SHEETS—SHEET 2.
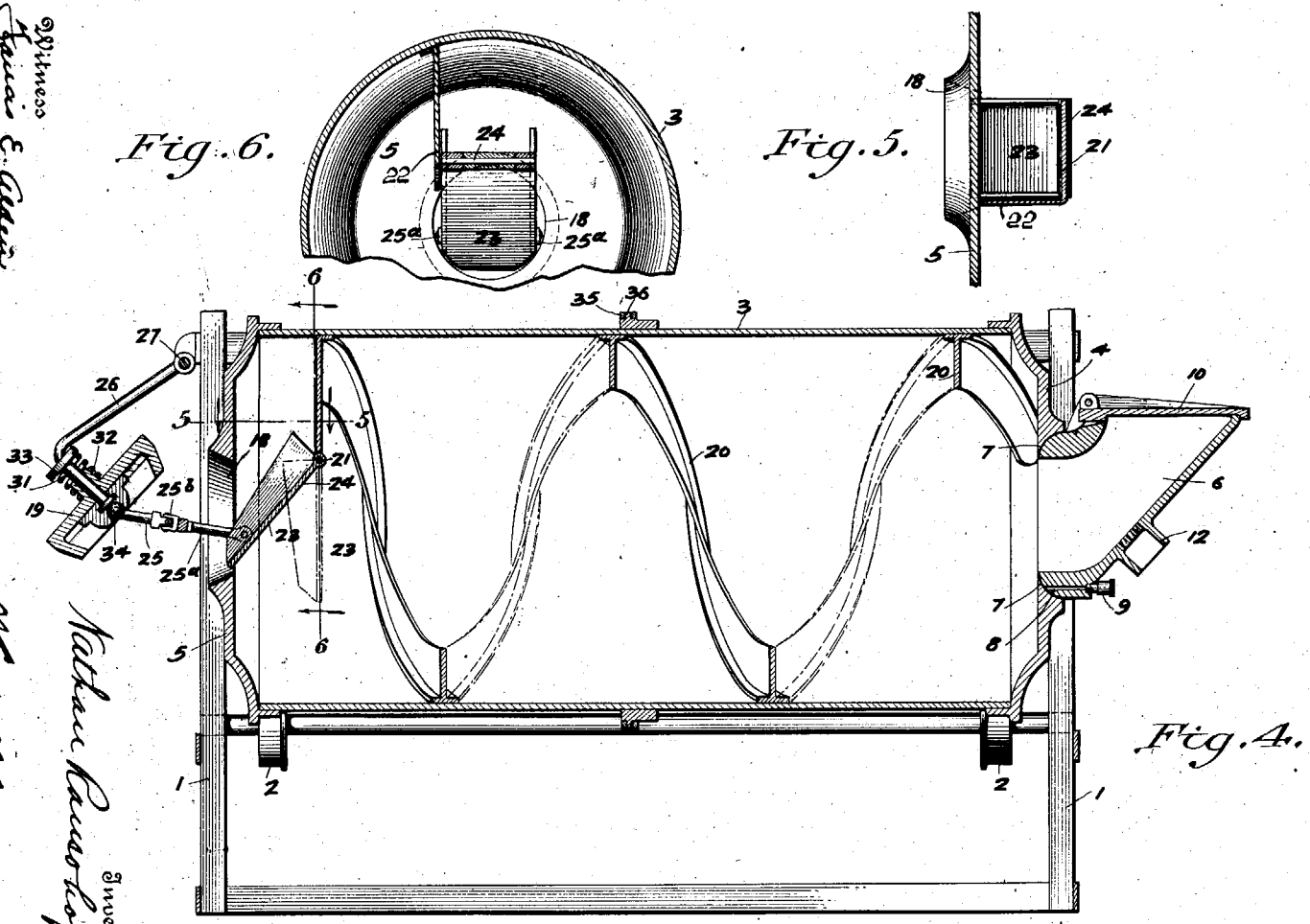
Witness
Frank E. Allen
Inventor:
Nathan Ransohoff
By Wood & Wood
Attorneys Reissued Nov. 28, 1922.

Re. 15,498

UNITED STATES PATENT OFFICE.

NATHAN RANSOHOFF, OF CINCINNATI, OHIO.

TUMBLING BARREL.

Original No. 1,297,400, dated March 18, 1919, Serial No. 270,396, filed January 9, 1919. Application for reissue filed May 28, 1920. Serial No. 385,070.

*To all whom it may concern:*

Be it known that I, NATHAN RANSOHOFF, a citizen of the United States, and residing at Cincinnati, in the county of Hamilton and State of Ohio, have invented a new and useful Improvement in Tumbling Barrels, of which the following specification is a full disclosure.

My invention relates to receptacles for holding metal parts or castings which are shaken and rolled around upon each other to smooth off and polish the surfaces of the castings by rotating or rocking the vessel in which the articles are placed. These receptacles are usually in the shape of a cylindrical barrel, with an opening in the side for charging and discharging the metal parts, and with this construction it is of course necessary that for charging the tumbling barrel the opening should be at the top, and for discharging the opening must be brought to the bottom and it therefore follows with the usual construction that the appartus has to be stopped during the loading and unloading.

It is the principal object of my invention to provide a construction which can be loaded and unloaded while running and which can be arranged to discharge into a wheelbarrow or other receptacle while rotating, and which may be equipped with a power loader for depositing in the barrel a complete batch from the ground level.

Another object of the invention is to provide a tumbling barrel having central openings in its opposite head, as intake and discharge openings, enabling the material to be fed or deposited into the barrel from one end and discharged from the other end while the barrel is rotating for a continuous operation of the barrel, and in the provision of chute means within the barrel and at the discharge end thereof controllable for receiving and discharging the product within the barrel through the discharge opening of the barrel.

Another object of my invention is to provide a tumbling barrel rotatable about a horizontal axis with inlet and discharge openings respectively at its opposite ends, having means within the barrel for conveying the material disposed therein from the inlet to the discharge end, and a chute controllable with the closure for the discharge opening, for conveying the material through the discharge opening after the closure has uncovered the discharge opening.

Another object is to provide a construction which can be readily and easily equipped with a suction tube for drawing off the dust and powder while the machine is still operating.

The invention consists of that certain novel construction and arrangement of parts to be hereinafter particularly pointed out and claimed under which the above objects are attained.

In the drawings,

Fig. 4 is a central longitudinal section of the barrel.

Fig. 5 is a section on line 5—5, Fig. 4.

Fig. 6 is a section on line 6—6, Fig. 4.

Figure 1:
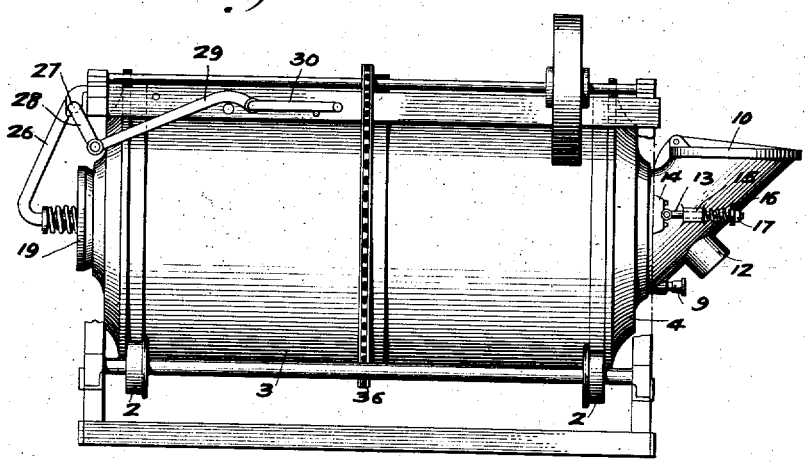
Figure 1 is a side elevation of my improved tumbling barrel.
Figure 2:
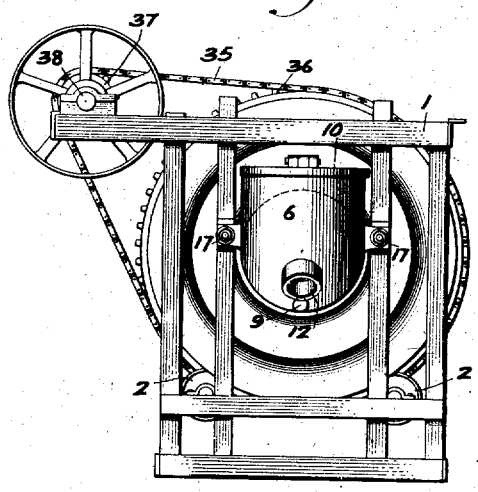
Figs. 2 and 3 are end elevations taken from the right and left hand ends of the machine as illustrated in Fig. 1.
Figure 3:
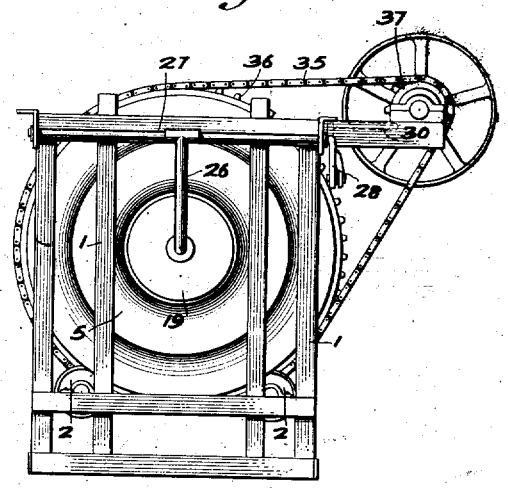

Supported in suitable end standards 1, 1, preferably on rollers 2, 2, is a cylindrical casing 3, with open ends closed by the heads 4, 5. One of these heads 4 is formed with a central opening for the reception of a receiving hopper 6. As the hopper is to remain stationary while the casing with its heads is rotated, to provide a dustproof joint between the hopper and head, I form semi-cylindrical engaging surfaces 7 between the head of the central opening and the inner surface of the hopper and arrange for an oil passageway 8 and a grease cup 9 to keep the joint lubricated. The hopper is provided with a closing lid or cover 10 and a short pipe section 12 which can be readily connected with an exhaust fan (not shown) for exhausting the dust from the barrel. The hopper is held stationary while the barrel revolves by means of spring bolts 13 on each side of the hopper secured to the frame at 14 and with the bolts passing through lugs 15 on the hopper and coiled springs 16 bearing between the adjusting nuts 17 on the end of the bolts and the lugs 15, so that a tight suction joint is maintained between the rotating barrel and the hopper thus held in engagement. The stationary hopper, however, may be displaced and the inlet opening through the head left uncovered, to receive the hopper of a power loader.

At the central portion of the opposite head 5 of the barrel, I provide a conically shaped discharge opening 18 in which the closing plug 19 is arranged to fit.

On the inside of the barrel is secured a spiral blade 20 extending from the receiving to the discharge end of the barrel. Near the discharge end this spiral blade terminates in a cup formed with a vertical side wall 21 and end wall 22 at right angles to the wall 21, and a movable or swinging bottom or chute 23, which is hinged to the side wall at 24.

The wall 22 lies in a plane parallel with a radial line through or lengthwise of the barrel, whereby the walls 21, 22, and portion of the inner periphery of the barrel, between the walls and head of the barrel, form a pocket, functioning as a scoop, for collecting the material fed to the discharge end of the barrel and carrying it upwardly with the revolution of the barrel, so as to rest upon the wall 21 until the wall reaches an inclined position, which will permit the material to slide by gravity off of the wall 22, for additional tumbling, or transferred upon the hinged bottom or chute 23 when disposed as a chute, as shown in Fig. 4, for discharging the material through the barrel head discharge opening.

This swinging bottom is pivotally connected with the plug 19 by the links 25 and $25^a$, coupled together with a double swiveled joint $25^b$, and when the plug is in its closed position the swinging bottom 23 will take the position shown in dotted lines in Fig. 1, in a direct line with the side wall of the cup, leaving the cup portion entirely open. When, however, the plug is withdrawn, the swinging bottom 23 will be drawn into a slanting position to the edge of the discharge opening. When the discharge opening is closed, the contents of the barrel will continue to tumble around through the open cup; but when the plug is withdrawn, the material will be discharged through the outlet.

The plug is operated by the lever 26 which is secured on the horizontal pivot rod 27 mounted in the upper end of the frame, and this arm is rocked by the rock arm 28 operated by the hand lever 29, provided with the handle 30. In order to maintain spring pressure on the plug 19, the inner end 31 of the lever 26 is connected directly to the end of the link 25, and a coiled spring 32 bears between a collar 33 on the lever and the plug, while the plug itself is loosely mounted on the portion 31, so as to slide on the rod. The connection between the inner end of the lever 26 and the link 25 at 34 is a universal joint connection, so as to permit the link to rotate with the barrel.

For rotating the barrel, the barrel rests on the rollers 2, 2, and it is rotated by the sprocket chain 35 which engages the sprocket wheel 36 formed on the circumference of the barrel and is driven by the sprocket 37 on the power shaft 38, driven by belt and pulley, or in any other suitable way.

It will be evident from the foregoing description that the tumbling barrel can be loaded and discharged while the barrel is rotated for a continuous operation if the tumbler capacity is ample for the service desired, and under such service the inlet and discharge would constantly open and the swinging chute member 23 would be in position to discharge the material deposited thereon, as one method of operation.

The machine may be supplied with a batch of material, which may be allowed to remain within the machine for a definite period and discharged at the pleasure of the operator, the discharge being controlled through the control of the swinging chute member 23.

While this description is confined to a tumbling barrel for cleaning and polishing castings, there is no desire to have the machine limited to such a field of use.

Having described my invention, I claim:

1. In a tumbling machine, a horizontally disposed rotatable cylindrical casing, with inlet and discharge openings at opposite ends at the axis of rotation of the casing, a fixed hopper, with connection therefor with the inlet opening for the reception of material while the casing is rotated, a door for the discharge opening, a hopper hinged within said casing and connected with said door for disposing said hopper in discharge position within said discharge opening when said door is opened.

2. In a tumbling machine, a horizontally disposed rotatable cylindrical casing, with inlet and discharge openings at opposite ends at the axis of rotation of the casing, a fixed hopper, with connection therefor with the inlet opening for the reception of material while the casing is rotated, and a door for the discharge opening, said casing, interiorly at its discharge end, provided with a pocket for conveying the material collected therein in an ascending half-revolution, to an elevation for discharging therefrom by gravity, and a swinging chute for said pocket, connected with said casing door, for receiving the contents of said pocket for conveying the same through the casing discharge opening when the said door is open.

3. In a tumbling machine, the combination with a frame and a rotatable casing mounted therein, of a fixed hopper mounted in the frame centrally of the casing, with a coupling joint therefor with the casing to permit the casing to rotate with the hopper stationary, the casing provided with a delivery opening at the opposite end, a swinging door mounted upon said frame and adapted to be opened or closed while the casing is rotating, whereby the casing can be used without stopping its rotation for loading and unloading the machine and a chute hinged within the casing and connected to said door for swinging the chute to an inclined position extending into the delivery opening of the casing to discharge the material from the casing when the door is opened.

4. In a tumbling machine, the combination with a frame and a rotatable casing mounted therein, of a fixed hopper mounted in the frame centrally of the casing, with a coupling joint therefor with the casing to permit the casing to rotate with the hopper stationary, a cup receptacle within the casing provided with a swinging bottom, a swinging door or plug for the delivery end of the casing, with connection intermediate the plug and the cup bottom, whereby upon the opening of the plug the cup bottom shall be shifted to direct the material to the discharge opening, and upon the closing of the plug the cup bottom shall be withdrawn.

5. In a tumbling machine, the combination with a frame and a rotatable casing mounted therein, of a fixed hopper mounted in the frame centrally of the casing, with a coupling joint therefor with the casing to permit the casing to rotate with the hopper stationary, a tight cover and an exhaust connection for the hopper, the casing provided with a delivery opening at the opposite end, with a swinging door adapted to be opened or closed while the casing is rotating, whereby the casing can be used without stopping its rotation for loading and unloading the machine.

6. In a tumbling machine, the combination with a frame and a rotatable casing mounted therein, of a fixed hopper mounted in the frame centrally of the casing, with a coupling joint therefor with the casing to permit the casing to rotate with the hopper stationary, a tight cover and an exhaust connection for the hopper, a cup receptacle within the casing provided with a swinging bottom, a swinging door or plug for the delivery end of the casing, with connection intermediate the plug and the cup bottom, whereby upon the opening of the plug the cup bottom shall be shifted to direct the material to the discharge opening, and upon the closing of the plug the cup bottom shall be withdrawn.

7. In a tumbling machine, the combination with a frame and a horizontally disposed rotatable cylindrical casing provided with an internal spiral conveyer and a cup receptacle at the delivery end of the conveyer, provided with a swinging bottom, with means for rotating the casing in the frame, of a fixed hopper mounted in the frame centrally of the casing, with a coupling joint therefor with the casing to permit the casing to rotate with the hopper stationary, a swinging door or plug for the delivery end of the casing, with a link connection between the plug and the cup bottom whereby upon the opening of the plug the cup bottom shall be shifted to direct the material to the discharge opening, and upon the closing of the plug the cup bottom shall be withdrawn.

8. In a machine of the class described, a cylindrical casing rotatable about a horizontal axis, and having a discharge opening centrally through one head end, said casing interior at its discharge end provided with a pocket for conveying the material collected therein, in an ascending half-revolution, to an elevation for discharge therefrom by gravity, and a swinging chute pivoted within and to said casing and adapted to be positioned to receive the contents from said pocket for conveying the same through the casing discharge opening.

9. In a machine of the class described, a cylindrical casing, rotatable about a horizontal axis, having a central discharge opening through the one head end of the casing, and an inlet opening at the opposite end of the casing, means internally of the casing for conveying the material from one end to an opposite discharge end and for carrying the material upwardly at said discharge end, on an ascending half-revolution during casing rotation to convey the material to a gravity discharged elevation, and a chute hingedly mounted within and to said casing, said chute adapted to move to functioning and non-functioning positions, in functioning position to receive the material and convey it to a discharge elevation to discharge the same from said casing through said discharge opening.

10. In a tumbling machine, the combination with a frame and a rotatable casing mounted therein, of a fixed hopper mounted in the frame centrally of the casing, with a coupling joint therefor with the casing to permit the casing to rotate with the hopper stationary, and a tight cover and an exhaust connection for the hopper.

11. In a tumbling machine, the combination with a frame, a horizontally disposed rotatable casing provided with an internal spiral conveyor, a cup receptacle at the delivery end of the conveyor having a swinging bottom, and means for swinging the bottom from a perpendicular position to a position transverse thereto, for receiving the material from the cup at a sweep in the rotative cycle, bringing the bottom at an incline to a horizontal plane and thereby conveying the material through an opening in the end of the casing.

In witness whereof, I hereunto subscribe my name, as attested by the two subscribing witnesses.

NATHAN RANSOHOFF.

Witnesses:
J. C. JUNIUS,
L. A. BECK.